United States Patent
Weinstock et al.

(10) Patent No.: US 7,275,038 B1
(45) Date of Patent: Sep. 25, 2007

(54) WEB ENABLED BUSINESS TO BUSINESS OPERATING SYSTEM FOR RENTAL CAR SERVICES

(75) Inventors: Timothy Robert Weinstock, St. Charles, MO (US); Kimberly Ann DeVallance, Maryland Heights, MO (US); Randall Allan Haselhorst, Imperial, MO (US); Craig Stephen Kennedy, St. Louis, MO (US); David Gary Smith, Wildwood, MO (US)

(73) Assignee: The Crawford Group, Inc., St. Louis, MO (US)

( * ) Notice: Subject to any disclaimer, the term of this patent is extended or adjusted under 35 U.S.C. 154(b) by 942 days.

(21) Appl. No.: 09/641,820

(22) Filed: Aug. 18, 2000

(51) Int. Cl.
  *G06Q 10/00* (2006.01)
(52) U.S. Cl. .............................. 705/5; 705/4
(58) Field of Classification Search .................... 705/1, 705/5, 6, 64, 13, 26
  See application file for complete search history.

(56) References Cited

U.S. PATENT DOCUMENTS

| | | |
|---|---|---|
| 4,714,989 A | 12/1987 | Billings |
| 4,757,267 A | 7/1988 | Riskin |
| 4,774,663 A | 9/1988 | Musmanno et al. |
| 4,788,643 A | 11/1988 | Trippe et al. |
| 4,797,818 A | 1/1989 | Cotter |
| 4,799,156 A | 1/1989 | Shavit et al. |
| 4,831,526 A | 5/1989 | Luchs et al. |
| 4,858,121 A | 8/1989 | Barber et al. |
| 4,891,785 A | 1/1990 | Donohoo |
| 4,897,867 A | 1/1990 | Foster et al. |
| 4,916,611 A | 4/1990 | Doyle, Jr. et al. |
| 4,931,932 A | 6/1990 | Dalnekoff et al. |
| 4,951,196 A | 8/1990 | Jackson |

(Continued)

FOREIGN PATENT DOCUMENTS

JP 2002074126 A * 9/2000

(Continued)

OTHER PUBLICATIONS

Travel Web site Expedia's shares take off during initial offering, Reeves, Nov. 1999, Denver Post Pg C-02, entire document.*

(Continued)

*Primary Examiner*—John G. Weiss
*Assistant Examiner*—Michael Fisher
(74) *Attorney, Agent, or Firm*—Thompson Coburn LLP

(57) ABSTRACT

An Internet enabled, business-to-business computerized transaction system is disclosed in its preferred embodiment for use in providing rental car services for high volume users and comprises an Internet web portal through which the high volume user may access an integrated business computer network for the rental vehicle service provider. The rental vehicle services provider computer network is configured to interconnect a geographically diverse plurality of branch offices, cataloguing their available rental vehicles and schedules for same as well as handling all transactional data relating to its business. The Internet web portal provides ubiquitous connectivity and portability for a multi-level business organization who regularly places high volumes of rental purchases with its business partner. Utilizing the method and apparatus of the present invention large volumes of rental transactions may be placed, monitored, altered during performance, and closed out with financial accounting and payment being made virtually without human intervention.

46 Claims, 2 Drawing Sheets

U.S. PATENT DOCUMENTS

| | | |
|---|---|---|
| 4,984,155 A | 1/1991 | Geier et al. |
| 5,058,044 A | 10/1991 | Stewart et al. |
| 5,063,506 A | 11/1991 | Brockwell et al. |
| 5,210,687 A | 5/1993 | Wolfberg et al. |
| 5,216,592 A | 6/1993 | Mann et al. |
| 5,218,697 A | 6/1993 | Chung |
| 5,224,034 A | 6/1993 | Katz et al. |
| 5,237,499 A | 8/1993 | Garback |
| 5,253,165 A | 10/1993 | Leiseca et al. |
| 5,270,922 A | 12/1993 | Higgins |
| 5,289,369 A | 2/1994 | Hirshberg |
| 5,309,355 A | 5/1994 | Lockwood |
| 5,311,425 A | 5/1994 | Inada |
| 5,319,542 A | 6/1994 | King, Jr. et al. |
| 5,355,474 A | 10/1994 | Thuraisngham et al. |
| 5,361,199 A | 11/1994 | Shoquist et al. |
| 5,369,570 A | 11/1994 | Parad |
| 5,375,207 A | 12/1994 | Blakely et al. |
| 5,390,314 A | 2/1995 | Swanson |
| 5,396,600 A | 3/1995 | Thompson et al. |
| 5,406,475 A | 4/1995 | Kouchi et al. |
| 5,422,809 A | 6/1995 | Griffin et al. |
| 5,432,904 A | 7/1995 | Wong |
| 5,465,206 A | 11/1995 | Hilt et al. |
| 5,471,615 A | 11/1995 | Amatsu et al. |
| 5,475,585 A | 12/1995 | Bush |
| 5,504,674 A | 4/1996 | Chen et al. |
| 5,506,897 A | 4/1996 | Moore et al. |
| 5,515,268 A | 5/1996 | Yoda |
| 5,528,490 A | 6/1996 | Hill |
| 5,530,844 A | 6/1996 | Phillips et al. |
| 5,544,040 A | 8/1996 | Gerbaulet |
| 5,544,320 A | 8/1996 | Konrad |
| 5,550,734 A | 8/1996 | Tarter et al. |
| 5,557,518 A | 9/1996 | Rosen |
| 5,570,283 A | 10/1996 | Shoolery et al. |
| 5,581,461 A | 12/1996 | Coll et al. |
| 5,586,313 A | 12/1996 | Schnittker et al. |
| 5,588,048 A | 12/1996 | Neville |
| 5,592,375 A | 1/1997 | Salmon et al. |
| 5,592,378 A | 1/1997 | Cameron et al. |
| 5,640,505 A | 6/1997 | Hearn et al. |
| 5,644,721 A | 7/1997 | Chung et al. |
| 5,664,207 A | 9/1997 | Crumpler et al. |
| 5,666,493 A | 9/1997 | Wojcik et al. |
| 5,694,551 A | 12/1997 | Doyle et al. |
| 5,696,901 A | 12/1997 | Konrad |
| 5,696,965 A | 12/1997 | Dedrick |
| 5,710,887 A | 1/1998 | Chelliah et al. |
| 5,710,889 A | 1/1998 | Clark et al. |
| 5,712,989 A | 1/1998 | Johnson et al. |
| 5,721,832 A | 2/1998 | Westrope et al. |
| 5,721,913 A | 2/1998 | Ackroff et al. |
| 5,724,520 A | 3/1998 | Goheen |
| 5,726,885 A | 3/1998 | Klein et al. |
| 5,732,398 A | 3/1998 | Tagawa |
| 5,734,823 A | 3/1998 | Saigh et al. |
| 5,754,772 A | 5/1998 | Leaf |
| 5,754,830 A | 5/1998 | Butts et al. |
| 5,757,925 A | 5/1998 | Faybishenko |
| 5,758,329 A | 5/1998 | Wojcik et al. |
| 5,758,341 A | 5/1998 | Voss |
| 5,764,981 A | 6/1998 | Brice et al. |
| 5,768,510 A | 6/1998 | Gish |
| 5,768,511 A | 6/1998 | Galvin et al. |
| 5,774,873 A | 6/1998 | Berent et al. |
| 5,778,178 A | 7/1998 | Arunachalam |
| 5,781,892 A | 7/1998 | Hunt et al. |
| 5,784,565 A | 7/1998 | Lewine |
| 5,793,966 A | 8/1998 | Amstein et al. |
| 5,794,207 A | 8/1998 | Walker et al. |
| 5,796,634 A | 8/1998 | Craport et al. |
| 5,796,967 A | 8/1998 | Filepp et al. |
| 5,797,126 A | 8/1998 | Helbling et al. |
| 5,799,157 A | 8/1998 | Escallon |
| 5,799,289 A | 8/1998 | Fukushima et al. |
| 5,802,293 A | 9/1998 | van der Sijpt |
| 5,802,530 A | 9/1998 | Van Hoff |
| 5,805,689 A | 9/1998 | Neville |
| 5,805,829 A | 9/1998 | Cohen et al. |
| 5,808,894 A | 9/1998 | Wiens et al. |
| 5,809,478 A | 9/1998 | Greco et al. |
| 5,818,715 A | 10/1998 | Marshall et al. |
| 5,819,274 A | 10/1998 | Jackson, Jr. |
| 5,832,451 A | 11/1998 | Flake et al. |
| 5,832,452 A | 11/1998 | Schneider et al. |
| 5,832,454 A | 11/1998 | Jafri et al. |
| 5,835,724 A | 11/1998 | Smith |
| 5,838,910 A | 11/1998 | Domenikos et al. |
| 5,838,916 A | 11/1998 | Domenikos et al. |
| 5,839,112 A | 11/1998 | Schreitmueller et al. |
| 5,839,114 A | 11/1998 | Lynch et al. |
| 5,842,176 A | 11/1998 | Hunt et al. |
| 5,847,957 A | 12/1998 | Cohen et al. |
| 5,848,131 A | 12/1998 | Shaffer et al. |
| 5,848,241 A | 12/1998 | Misinai et al. |
| 5,850,446 A | 12/1998 | Berger et al. |
| 5,857,191 A | 1/1999 | Blackwell, Jr. et al. |
| 5,862,346 A | 1/1999 | Kley et al. |
| 5,864,818 A | 1/1999 | Feldman |
| 5,864,827 A | 1/1999 | Wilson |
| RE36,111 E | 2/1999 | Neville |
| 5,870,719 A | 2/1999 | Maritzen et al. |
| 5,870,733 A | 2/1999 | Bass et al. |
| 5,875,110 A | 2/1999 | Jacobs |
| 5,877,765 A | 3/1999 | Dickman et al. |
| 5,881,230 A | 3/1999 | Christensen et al. |
| 5,889,863 A | 3/1999 | Weber |
| 5,889,942 A | 3/1999 | Orenshteyn |
| 5,890,129 A | 3/1999 | Spurgeon |
| 5,890,140 A | 3/1999 | Clark et al. |
| 5,892,905 A | 4/1999 | Brandt et al. |
| 5,893,904 A | 4/1999 | Harris et al. |
| 5,897,620 A | 4/1999 | Walker et al. |
| 5,898,835 A | 4/1999 | Truong |
| 5,901,214 A | 5/1999 | Shaffer et al. |
| 5,903,873 A | 5/1999 | Peterson et al. |
| 5,907,608 A | 5/1999 | Shaffer et al. |
| 5,909,542 A | 6/1999 | Paquette et al. |
| 5,909,570 A | 6/1999 | Webber |
| 5,910,982 A | 6/1999 | Shaffer et al. |
| 5,915,241 A | 6/1999 | Giannini |
| 5,918,215 A | 6/1999 | Yoshioka et al. |
| 5,920,696 A | 7/1999 | Brandt et al. |
| 5,923,552 A | 7/1999 | Brown et al. |
| 5,926,793 A | 7/1999 | de Rafael et al. |
| 5,926,798 A | 7/1999 | Carter |
| 5,930,474 A | 7/1999 | Dunworth et al. |
| 5,931,917 A | 8/1999 | Nguyen et al. |
| 5,933,810 A | 8/1999 | Okawa |
| 5,944,784 A | 8/1999 | Simonoff et al. |
| 5,946,660 A | 8/1999 | McCarty et al. |
| 5,946,687 A | 8/1999 | Gehani et al. |
| 5,948,040 A | 9/1999 | DeLorme et al. |
| 5,950,169 A | 9/1999 | Borghesi et al. |
| 5,953,706 A | 9/1999 | Patel |
| 5,956,397 A | 9/1999 | Shaffer et al. |
| 5,956,487 A | 9/1999 | Venkatraman et al. |
| 5,956,509 A | 9/1999 | Kevner |
| 5,961,569 A | 10/1999 | Craport et al. |
| 5,961,572 A | 10/1999 | Craport et al. |
| 5,963,915 A | 10/1999 | Kirsch |
| 5,966,451 A | 10/1999 | Utsumi |
| 5,970,475 A | 10/1999 | Barnes et al. |

| | | | | | | |
|---|---|---|---|---|---|---|
| 5,973,619 A | 10/1999 | Paredes | | 6,192,415 B1 | 2/2001 | Haverstock et al. |
| 5,974,444 A | 10/1999 | Konrad | | 6,205,482 B1 | 3/2001 | Navarre et al. |
| 5,977,966 A | 11/1999 | Bogdan | | 6,223,094 B1 | 4/2001 | Muehleck et al. |
| 5,978,577 A | 11/1999 | Rierden et al. | | 6,226,654 B1 | 5/2001 | Van Hoff |
| 5,978,747 A | 11/1999 | Craport et al. | | 6,226,675 B1 | 5/2001 | Meltzer et al. |
| 5,978,817 A | 11/1999 | Giannandrea et al. | | 6,229,534 B1 | 5/2001 | Gerra et al. |
| 5,978,834 A | 11/1999 | Simonoff et al. | | 6,230,117 B1 | 5/2001 | Lymer et al. |
| 5,978,840 A | 11/1999 | Nguyen et al. | | 6,233,329 B1 | 5/2001 | Urban et al. |
| 5,982,867 A | 11/1999 | Urban et al. | | 6,233,609 B1 * | 5/2001 | Mittal ........................ 709/219 |
| 5,982,868 A | 11/1999 | Shaffer et al. | | 6,240,365 B1 | 5/2001 | Bunn |
| 5,983,200 A | 11/1999 | Slotznick | | 6,253,188 B1 | 6/2001 | Witek et al. |
| 5,983,208 A | 11/1999 | Haller et al. | | 6,272,528 B1 | 8/2001 | Cullen et al. |
| 5,987,423 A | 11/1999 | Arnold et al. | | 6,272,675 B1 | 8/2001 | Schrab et al. |
| 5,991,739 A | 11/1999 | Cupps et al. | | 6,275,843 B1 | 8/2001 | Chorn |
| 5,995,939 A | 11/1999 | Berman et al. | | 6,282,489 B1 | 8/2001 | Bellesfield et al. |
| 5,996,017 A | 11/1999 | Cipiere | | 6,282,517 B1 | 8/2001 | Wolfe et al. |
| 6,002,767 A | 12/1999 | Kramer | | 6,282,568 B1 | 8/2001 | Sondur et al. |
| 6,005,568 A | 12/1999 | Simonoff et al. | | 6,286,028 B1 | 9/2001 | Cohen et al. |
| 6,006,148 A | 12/1999 | Strong | | 6,292,185 B1 | 9/2001 | Ko et al. |
| 6,006,201 A | 12/1999 | Berent et al. | | 6,304,892 B1 | 10/2001 | Bhoj et al. |
| 6,009,464 A | 12/1999 | Hamilton et al. | | 6,308,120 B1 | 10/2001 | Good |
| 6,012,083 A | 1/2000 | Savitzky et al. | | 6,308,160 B1 | 10/2001 | Rex |
| 6,014,673 A | 1/2000 | Davis et al. | | 6,311,207 B1 | 10/2001 | Mighdoll et al. |
| 6,014,702 A | 1/2000 | King et al. | | 6,311,213 B2 | 10/2001 | Dawson et al. |
| 6,016,496 A | 1/2000 | Roberson | | 6,324,568 B1 | 11/2001 | Diec |
| 6,018,627 A | 1/2000 | Iyengar et al. | | 6,327,574 B1 | 12/2001 | Kramer et al. |
| 6,021,406 A | 2/2000 | Kuznetsov | | 6,332,163 B1 | 12/2001 | Bowman-Amuah |
| 6,023,679 A | 2/2000 | Acebo et al. | | 6,334,146 B1 | 12/2001 | Parasnis et al. |
| 6,026,379 A | 2/2000 | Haller et al. | | 6,336,100 B1 | 1/2002 | Yamada |
| 6,031,533 A | 2/2000 | Peddada et al. | | 6,339,773 B1 | 1/2002 | Rishe |
| 6,043,815 A | 3/2000 | Simonoff et al. | | 6,343,290 B1 | 1/2002 | Cossins et al. |
| 6,044,382 A | 3/2000 | Martino | | 6,351,738 B1 | 2/2002 | Clark |
| 6,049,774 A | 4/2000 | Roy | | 6,363,388 B1 | 3/2002 | Sprenger et al. |
| 6,049,832 A | 4/2000 | Brim et al. | | 6,370,523 B1 | 4/2002 | Anderson |
| 6,054,983 A | 4/2000 | Simonoff et al. | | 6,381,324 B1 | 4/2002 | Shaffer et al. |
| 6,058,179 A | 5/2000 | Shaffer et al. | | 6,381,603 B1 | 4/2002 | Chan et al. |
| 6,058,378 A | 5/2000 | Clark et al. | | 6,385,312 B1 | 5/2002 | Shaffer et al. |
| 6,061,665 A | 5/2000 | Bahreman | | 6,393,415 B1 | 5/2002 | Getchius et al. |
| 6,061,691 A | 5/2000 | Fox | | 6,393,471 B1 | 5/2002 | Kobata |
| 6,064,973 A | 5/2000 | Smith et al. | | 6,397,191 B1 | 5/2002 | Notani et al. |
| 6,070,142 A | 5/2000 | McDonough et al. | | 6,397,208 B1 | 5/2002 | Lee |
| 6,072,870 A | 6/2000 | Nguyen et al. | | 6,397,219 B2 | 5/2002 | Mills |
| 6,073,163 A | 6/2000 | Clark et al. | | 6,401,094 B1 | 6/2002 | Stemp et al. |
| 6,076,067 A | 6/2000 | Jacobs et al. | | 6,418,400 B1 | 7/2002 | Webber |
| 6,078,321 A | 6/2000 | Simonoff et al. | | 6,477,452 B2 | 11/2002 | Good |
| 6,078,322 A | 6/2000 | Simonoff et al. | | 6,542,912 B2 | 4/2003 | Meltzer et al. |
| 6,084,585 A | 7/2000 | Kraft et al. | | 6,567,783 B1 | 5/2003 | Notani et al. |
| 6,085,169 A | 7/2000 | Walker et al. | | 2001/0005831 A1 | 6/2001 | Lewin et al. |
| 6,085,170 A | 7/2000 | Tsukuda | | 2001/0008998 A1 | 7/2001 | Tamaki et al. |
| 6,088,677 A | 7/2000 | Spurgeon | | 2001/0010058 A1 | 7/2001 | Mittal |
| 6,091,409 A | 7/2000 | Dickman et al. | | 2001/0011222 A1 | 8/2001 | McLauchlin et al. |
| 6,091,412 A | 7/2000 | Simonoff et al. | | 2001/0011246 A1 | 8/2001 | Tammaro |
| 6,091,810 A | 7/2000 | Shaffer et al. | | 2001/0014907 A1 | 8/2001 | Brebner |
| 6,094,640 A * | 7/2000 | Goheen ........................ 705/5 | | 2001/0016825 A1 | 8/2001 | Pugliese, III et al. |
| 6,097,802 A | 8/2000 | Fleischer, III et al. | | 2001/0016868 A1 | 8/2001 | Nakamura et al. |
| 6,101,496 A | 8/2000 | Esposito | | 2001/0018661 A1 | 8/2001 | Sato et al. |
| 6,108,650 A | 8/2000 | Musk et al. | | 2001/0021912 A1 | 9/2001 | DeMarcken et al. |
| 6,112,185 A | 8/2000 | Walker et al. | | 2001/0027420 A1 | 10/2001 | Boublik et al. |
| 6,119,105 A | 9/2000 | Williams | | 2001/0027483 A1 | 10/2001 | Gupta et al. |
| 6,119,149 A | 9/2000 | Notani | | 2001/0029459 A1 | 10/2001 | Fujiwara |
| 6,122,642 A | 9/2000 | Mehovic | | 2001/0032113 A1 | 10/2001 | Rudnick |
| 6,125,384 A | 9/2000 | Brandt et al. | | 2001/0032273 A1 | 10/2001 | Cheng |
| 6,125,391 A | 9/2000 | Meltzer et al. | | 2001/0037224 A1 | 11/2001 | Eldridge et al. |
| 6,144,944 A | 11/2000 | Kurtzman, II et al. | | 2001/0037255 A1 | 11/2001 | Tambay et al. |
| 6,144,990 A | 11/2000 | Brandt et al. | | 2001/0037298 A1 | 11/2001 | Ehrman et al. |
| 6,148,289 A | 11/2000 | Virdy | | 2001/0037331 A1 | 11/2001 | Lloyd |
| 6,148,290 A | 11/2000 | Dan et al. | | 2001/0044811 A1 | 11/2001 | Ballantyne et al. |
| 6,154,172 A | 11/2000 | Piccionelli et al. | | 2001/0056361 A1 | 12/2001 | Sendouda |
| 6,163,772 A | 12/2000 | Kramer et al. | | 2002/0004796 A1 | 1/2002 | Vange et al. |
| 6,175,832 B1 | 1/2001 | Luzzi et al. | | 2002/0007289 A1 | 1/2002 | Malin et al. |
| 6,178,409 B1 | 1/2001 | Weber et al. | | 2002/0010781 A1 | 1/2002 | Tuatini |
| 6,185,290 B1 | 2/2001 | Shaffer et al. | | 2002/0019821 A1 | 2/2002 | Rosenbluth |
| 6,189,003 B1 | 2/2001 | Leal | | 2002/0022979 A1 | 2/2002 | Whipp et al. |

| | | |
|---|---|---|
| 2002/0026337 A1 | 2/2002 | Sasaki |
| 2002/0032626 A1 | 3/2002 | DeWolf et al. |
| 2002/0032790 A1 | 3/2002 | Linderman |
| 2002/0035488 A1 | 3/2002 | Aquila et al. |
| 2002/0040352 A1 | 4/2002 | McCormick |
| 2002/0042843 A1 | 4/2002 | Diec |
| 2002/0042849 A1 | 4/2002 | Ho et al. |
| 2002/0046213 A1 | 4/2002 | Vinati et al. |
| 2002/0046294 A1 | 4/2002 | Brodsky et al. |
| 2002/0046301 A1 | 4/2002 | Shannon et al. |
| 2002/0049603 A1 | 4/2002 | Mehra et al. |
| 2002/0062262 A1 | 5/2002 | Vasconi et al. |
| 2002/0069123 A1 | 6/2002 | Soderlind et al. |
| 2002/0072937 A1 | 6/2002 | Domenick et al. |
| 2002/0072938 A1 | 6/2002 | Black et al. |
| 2002/0073236 A1 | 6/2002 | Helgeson et al. |
| 2002/0076029 A1 | 6/2002 | Shaffer et al. |
| 2002/0082912 A1 | 6/2002 | Batachia et al. |
| 2002/0083095 A1 | 6/2002 | Wu et al. |
| 2002/0083099 A1 | 6/2002 | Knauss et al. |
| 2002/0091533 A1 | 7/2002 | Ims et al. |
| 2002/0095319 A1 | 7/2002 | Swart et al. |
| 2002/0099562 A1 | 7/2002 | Bruce, Sr, et al. |
| 2002/0099613 A1 | 7/2002 | Swart et al. |
| 2002/0099735 A1 | 7/2002 | Schroeder et al. |
| 2002/0099738 A1 | 7/2002 | Grant |
| 2002/0106069 A1 | 8/2002 | Shaffer et al. |
| 2002/0107918 A1 | 8/2002 | Shaffer et al. |
| 2002/0111876 A1 | 8/2002 | Rudraraju et al. |
| 2002/0116205 A1 | 8/2002 | Ankireddipally et al. |
| 2002/0116454 A1 | 8/2002 | Dyla et al. |
| 2002/0120459 A1 | 8/2002 | Dick et al. |
| 2002/0120776 A1 | 8/2002 | Eggebraaten et al. |
| 2002/0129021 A1 | 9/2002 | Brown |
| 2002/0133359 A1 | 9/2002 | Brown |
| 2002/0133517 A1 | 9/2002 | Carlson et al. |
| 2002/0136381 A1 | 9/2002 | Shaffer et al. |
| 2002/0143644 A1 | 10/2002 | Tosun et al. |
| 2002/0152100 A1 | 10/2002 | Chen et al. |
| 2002/0156693 A1 | 10/2002 | Stewart et al. |
| 2002/0156865 A1 | 10/2002 | Rajarajan et al. |
| 2002/0169842 A1 | 11/2002 | Christensen et al. |
| 2002/0178087 A1 | 11/2002 | Henderson et al. |
| 2002/0184054 A1 | 12/2002 | Cox et al. |
| 2002/0184266 A1 | 12/2002 | Blessin |
| 2002/0188761 A1 | 12/2002 | Chikirivao et al. |
| 2002/0194219 A1 | 12/2002 | Bradley et al. |
| 2002/0198743 A1 | 12/2002 | Ariathurai et al. |
| 2003/0004822 A1 | 1/2003 | Shorter et al. |
| 2003/0009545 A1 | 1/2003 | Sahai et al. |
| 2003/0014270 A1 | 1/2003 | Qureshi et al. |
| 2003/0014295 A1 | 1/2003 | Brookes et al. |
| 2003/0018666 A1 | 1/2003 | Chen et al. |
| 2003/0023450 A1 | 1/2003 | Casati et al. |
| 2003/0028404 A1 | 2/2003 | Herron et al. |
| 2003/0028533 A1 | 2/2003 | Bata et al. |
| 2003/0036917 A1 | 2/2003 | Hite et al. |
| 2003/0036966 A1 | 2/2003 | Amra et al. |
| 2003/0041180 A1 | 2/2003 | Schlussman |
| 2003/0114967 A1 | 6/2003 | Good |
| 2003/0149600 A1 | 8/2003 | Williams |

FOREIGN PATENT DOCUMENTS

| | | |
|---|---|---|
| JP | 02001344490 A | 12/2001 |
| WO | WO 99/66738 | 12/1999 |
| WO | WO 01/97072 | 12/2001 |
| WO | WO 02/29675 | 4/2002 |

OTHER PUBLICATIONS

Copyright Chronicle Publishing Company, May 2, 1997, "Booking a room, vehicle for vacation via the 'Net'", Pantagraph, C. 1.

Yenckel, James T., Feb. 11, 1996, "For This Cyberspace Visitor, Once Is More Than Enough", The Washington Post (Pre-1997 Fulltext), ISSN 01908286, p. E.01.

U.S. Appl. No. 60/194,128, Aquila.

"Information on Hertz Corporation"; Sep. 24, 2002; pp. 1-61.

"Welcome to the Hertz Interactive Reservation Process"; Mar. 3, 2000; pp. 62-27.

"All Open Orders for Customer No. 218556"; Motorola Corporation; Nov. 23, 1999.

Nelson, Stephen L.; Quicken 99 for Windows for Dummies: IDG Books Worldwide, Inc.; 1998; pp. 114, 122-124.

U.S. Appl. No. 09/596,024, filed Jun. 15, 2000, Shaffer et al.

U.S. Appl. No. 09/678,752, filed Oct. 3, 2000, Shaffer et al.

CarTemps Rent-A-Car; "MPOWERENT Management System"; Copyright 2000; publication date unknown.

St. Louis Business Journal; "E-commerce Department Director Answers Questions about TWA.com"; Aug. 28, 2000; St. Louis, Missouri.

ARMS/400 Automated Rental Management System, Copyright 1999.

ARMS/400 Automated Rental Management System, Copyright 1998.

ARMS/400 Automated Rental Management System, Version 3, Feb. 1997.

The Jacada User Guide: Jacada for Java, Version 6.0, CST Catalog UG-213-0799, 1st Ed., Jul. 1999.

Planning and Managing a Project, Version 5.3, CST Catalog UG-184-1198, 1st Ed., Nov. 1998, pp. 1-90.

Interoffice Memorandum re ARMS OUTLINE, Oct. 7, 1999, pp 1-2.

EnterpriseRent-A-Car Rental Application Development and Support Project Request, Jul. 6, 1999, pp. 1-2.

Enterprise Rent-A-Car Rental Application Development and Support Project Request, Jul. 12, 1999, pp. 1-3.

King, Jeff and Estes, Steve, Enterprise Rent-A-Car ARMS Web-enabled Management Reporting System Initial Project Analysis & Options, Jul. 23, 1999, pp. 1-7.

Email from Angela Babin, Jun. 22, 1999, single page.

Edlund, Al, "How Thin Clients Lead to Fat Networks", Business Communications Review, Jul. 1998, pp. 28-31.

Darrah, Matt; Hi-Tech Streamlines Car Rental Process; Feb. 1999; Vol. 66, Issue 2; p. 29.

10K Report; Agency Rent-A-Car Inc.; Report No. 0127651; Section Heading: PART 1, ITEM 1. Business; Jan. 31, 1994; p. 4 of 54.

Travel Agent; Many Ways to Sell: Oct. 2, 1995; vol. 0, No. 0; p. 36.

Enterprise Computer Assisted Rental System Workbook, Sep. 1997.

Enterprise Computer Assisted Rental System Workbook, Dec. 1996.

Enterprise Rent-A-Car Company, ECARS Workbook, Dec. 1996.

ECARS - Enterprise Computer Assisted Rental System, AACJ01 Callbacks, pp. 1-9, Jul 1, 1997.

ARMS/400 Update, pp. 1-7, Jan. 7, 2000.

Enterprise Rent-A-Car Company, Automated Rental Management System (ARMS), Version 1.1, Jan. 5, 1994.

Enterprise Rent-A-Car Company, Automated Rental Management System (ARMS), Version 1, Apr. 12, 1993.

ARMS Electronic Callback System Demonstration, pp. 1-22, 1998.

PC/ARMS Demonstration, pp. 1-45, 1995.

ARMS/400 User Manual, 1999.

Enterprise Rent-A-CAr Company, ARMS, Automated Rental Management System, pp. 1-36.

1997 Rental Systems Manual, 1997.

A Call To ARMS, 1996.

AACB35 Fax Display, pp. 1-5.

AACM07, Customer Add/Update, Revised Documentation, pp. 1-12, Sep. 17, 2001.

AAGP12, Group/Branch Name and Address Add/Update, pp. 1 through 2-8, Nov. 19, 1999.

AAPW01 Update Code Maintenance, Jul. 1, 1999, pp. 1-25.

ABC Insurance Company/EngineRoar, pp. 1-2.

ARMS 400 Demonstration, pp. 1-67.

ARMS Claims Internet Quick Reference Guide, Oct. 1999.

ARMS Overview, pp. 1-10.

ARMS Technology, Jul. 2000.

ARMS/400 - Automated Rental Management System, pp. 1-8, 1995.
ARMS/400 - ERAC Employee Reference, pp. 1-10.
ARMS/400 Main Menu Flow, pp. 1-20.
ARMS/400 Manual.
ARMS/400 Training System Document, Nov. 16, 1998.
ARMS/400 Update, Mar. 15, 2000, pp. 1-4.
ARMS/400 Update, pp. 1-6.
ARMS/400 User Training, Jul. 2000, pp. 1-26.
ARMS/ECARS Handbook for ARMS/Claims Developers, pp. 1-19.
ARMS/Web User Training, pp. 1-38, Jul. 18, 2000.
ARMS/Web Using Jacada, Oct. 13, 1999, pp. 1-13.
Automated Rentals, Unwrapped, pp. 1-7, Oct. 1995.
Bluebird Auto Rental Systems, "Are You Buried Under An Evergrowing Mountain of Paper?".
Bluebird Auto Rental Systems, Business Description & Products.
Car Rental Insider, May 1997, pp. 1-4.
Close Pending Ticket Report ( All Tickets pended for 5 days or more), Job #579, DR0018, Apr. 3, 1996, pp. 1-2.
CST, May 6, 1999, pp. 1-18.
Customer Account Services, AACB45.
D. P. General Use Programs, AACB10 Consolidated Callback Maintenance, Apr. 1994, pp. 1-4.
D. P. General Use Programs, AACM12, ECARS - Special Instructions/Rates/Rate Rules, Jun. 1993, pp. 1-5.
Data Warehouse & Analyzer Quick Sheet, Jun. 2000, pp. 1-2.
Dollar Rent A Car Systems, Inc., pp. 1-5, 1998.
ECARS 2000 Customer Profile, Chapters 1-16.
ECARS Backdated Ticket Report, Job #043/DR0099, Mar. 1996, pp. 1-2.
eINFO, Data Warehouse, Oct. 1999.
Email exchange between Ken Keller and David Smith, Jun. 4, 1997.
EngineRoar.com, pp. 3-76.
Enterprise Network and Physical Connections Overview, 1995, pp. 1-5.
Enterprise Rent-A-Car Company, AACM27/AACM28, Overview, pp. 1-8, Nov. 22, 1999.
Enterprise Rent-A-Car Company, ARMS Basics and Concepts, vol. 1, Chapter 1-4, Feb. 24, 1998.
Enterprise Rent-A-Car Company, ARMS Basics and Concepts, vol. 1, Chapters 1-4, Jun. 10, 1998.
Enterprise Rent-A-Car Company, ARMS Technical Document (ATD Internal), pp. 1-40, Aug. 2, 1993.
Enterprise Rent-A-Car Company, Functional Specification, pp. 1-2, Nov. 1999.
Enterprise Rent-A-Car Customer Profile Data Form, pp. 1-14.
Enterprise Rent-A-Car, ARMS Online Reporting, Project Charter, Version 1.0, Aug. 20, 1999, pp. 1-7.
Everything You Need to Know About ARMS Automotive, 2000, pp. 1-8.
Future State Summary, Jun. 1999, pp. 1-8.
http://www.eautoclaims.com, pp. 1-11, Apr. 8, 2000.
http://www.hertz.com/InteractionRes/htm/isexckge.htm, pp. 1-2, Mar. 20, 1997.
Introducing ARMS Claims, Jun. 2000, pp. 1-6.
IS General Use Programs - Section 15, AACB40, Overview, pp. 1-16, Jun. 22, 2000.
IS General Use Programs - Section 19, AACB34 Callback Fax Customization, Mar. 5, 1998.
Jacada Implementation Methodology, pp. 1-10, May 12, 1999.
Jacada, Chicago Executive Briefing, Nov. 4, 1999, pp. 1-13.
Kenyon, Stephanie, "20 Tips for an Effective Web Site", ASTA Agency Management, Jan. 1999.
Lone Star Rental Systems, EZ Traker ™, Your Complete Auto Rental Management Solution.
Lorentz, Jeff, Functional Specification, Internet Application Development, ARMS Automotive, pp. 1-3.
Marino, Donna, "Internet Experts Urge Development of E-Commerce Models", ASTA Agency Management, Jan. 1999, pp. 32-34.
McKeown, Rosemary, "The Right Computer System Adds to Your Revenue", Computer Systems, pp. 1-4.
Memorandum re Sabre Meeting, Rob Hibbard to Scott Shuler, Sep. 21, 1998.
Milligan, Michael, "OTA targets mid-January to release e-commerce protocol", Travel Weekly, Jan. 10, 2000.
Net rentacar.com User Guide, Pages 1-19.
Open Travel Alliance, "ebXML Uses Opentravel Alliance Specification for Early Tests", May 10, 2000.
Open Travel Alliance, "Open Travel Alliance Joins Forces with DISA", Sep. 9, 1999.
Open Travel Alliance, "Open Travel Alliance Names Board Officers", Sep. 2, 1999.
Open Travel Alliance, "Open Travel Alliance's New XML Specification Creates a Common Customer Profile for Travelers", Feb. 29, 2000.
Open Travel Alliance, "White Paper", pp. 1-20, Feb. 2000.
Orion Systems, Ltd., pp. 1-36.
Orion Systems, Ltd., System Overview and Handheld Terminals, downloaded from www.orsys.com on Dec. 1, 1997, pp. 1-5.
Orion Systems, Ltd., System Overview with Screens and Reports, May 1996.
Our Packages Come In All Sizes!, Nov. 1999, pp. 1-2.
PGMR, ECARS - Enterprise Computer Assisted Rental System, pp. 1-4.
Preview Travel, Inc., Car Reservations, 1999.
Rental 101, pp. 1-30.
Rental Redesign Requirements - Contract Process, pp. 1-5, Feb. 16, 2000.
Rental Redesign Requirements Contract, pp. 1-56, Feb. 15, 2000.
Rental Redesign, Rental Management, RMS (Rental Management Services), Sep. 30, 1998, pp. 1-2.
Rosen, Cheryl, "OTA Debuts Data Protocol", Business Travel News, Jan. 10, 2000.
Rosen, Cheryl, "OTA Publishes XML Data Standard", Business Travel News, pp. 1-2, Mar. 20, 2000.
The ARMS Connection, Safeco/Enterprise Rent-A-Car, pp. 1-4.
The Connection, State Farm Insurance/Enterprise Rent-A-Car, Rental Process Automation and Procedures, pp. 1-3.
The Hertz Corporation, 1998.
TSD Brochure, "Are You Comparing Apples to Apples When Choosing Rental Software", pp. 1-3.
TSD Brochure, RENT 2000 from TSD, Rental Management Software, Revolutionize the Way You Do Business, pp. 1-29.
TSD Brochure, Rent 2000 from TSD, Rental Management Software, Revolutionize the Way You Do Business with the Proven Solution, pp. 1-2.
Warner, Fara, "Car Race in Cyberspace".
Welcome to ARMS/400, New York State Rollout and Implementation Session, Oct. 28, 1999, pp. 1-51.
Welcome to the Data Warehouse, Jun. 2000, pp. 1-2.
Interactions, vol. 1, No. 3, Jul. 1992.
Interactions, Special Edition, vol. 1, No. 4, Aug. 1992.
Interactions, vol. 1, No. 5, Sep. 1992.
Interactions, Special Edition, Nov. 1992.
Interactions, vol. 1, No. 8, Dec. 1992.
Interactions, vol. 2, No. 1, Jan. 1993.
Interactions, vol. 2, No. 5, May 1993.
Interactions, vol. 2, No. 7, Jul. 1993.
Interactions, vol. 2, No. 8, Aug. 1993.
Interactions, vol. 2, No. 11, Oct. 1, 1993.
Interactions, vol. 2, No. 13, Nov. 1, 1993.
Interactions, vol. 2, No. 14, Nov. 15, 1993.
Interactions, Published especially for our Farmers adjusters, 1994.
Interactions, vol. 3, No. 1, Jan. 1, 1994.
Interactions, vol. 3, No. 1, Jan. 15, 1994.
Interactions, ARMS, vol. 3, No. 6, Mar. 15, 1994.
Interactions, vol. 3, No. 8, Apr. 15, 1994.
Interactions, vol. 3, No. 10, May 15, 1994.
Interactions, vol. 3, No. 11, Jun. 1, 1994.
Interactions, vol. 3, No. 12, Jun. 15, 1994.
Interactions, vol. 3, No. 14, Jul. 15, 1994.
Interactions, vol. 3, No. 15, Aug. 1, 1994.
Interactions, vol. 3, No. 16, Aug. 15, 1994.
Interactions, vol. 3, No. 21, Nov. 1, 1994.
Interactions, vol. 3, No. 23, Dec. 1, 1994.
Interactions, vol. 4, No. 3, Feb. 1, 1995.

Interactions, "Electronic Connections", p. 3, Mar. 15, 1995.
Interactions, vol. 4, No. 6, Mar. 15, 1995.
Interactions, vol. 4, No. 9, May 1, 1995.
Interactions, vol. 4, Issue 14, Jul. 15, 1995.
Interactions, vol. 4, Issue 16, Aug. 15, 1995.
Interactions, vol. 4, Issue 19, Oct. 1, 1995.
Interactions, vol. 4, Issue 21, Nov. 1, 1995.
Interactions, vol. 4, Issue 24, Dec. 15, 1995.
Interactions, vol. 5, Issue 1, Jan. 1, 1996.
Interactions, vol. 5, Issue 2, Jan. 15, 1996.
Interactions, vol. 5, Issue 4, Feb. 15, 1996.
Interactions, vol. 5, Issue 13, Oct. 1, 1996.
Interactions, vol. 5, Issue 14, Nov. 1, 1996.
Interactions, ARMS Update, vol. 6, Issue 2, Feb. 1997.
Interactions, vol. 6, Issue 8, Aug. 1997.
Interactions, vol. 6, Issue 12, Dec. 1997.
Interactions, vol. 7, Issue 1, Jan. 1998.
Interactions, vol. 7, Issue 5, May 1998.
Interactions, vol. 7, Issue 7, Jul. 1998.
Interactions, vol. 7, Issue 8, Aug. 1998.
Interactions, vol. 7, Issue 12, Dec. 1998.
Interactions, vol. 8, Issue 7, Jul. 1999.
Interactions, vol. 8, Issue 8, Aug. 1999.
Interactions, vol. 8, Issue 9, Sep. 1999.
Interactions, vol. 9, Issue 2, Feb. 2000.
Interactions, vol. 9, Issue 3, Mar. 2000.
Interactions, vol. 9, Issue 5, May 2000.
Internet Networking Architecture, 1999.
Enterprise Rent-A-Car ARMS - Vehicle Messaging System, Project Charter, Oct. 15, 1998, pp. 1-7.
GUI ARMS/400 Development, pp. 1-2, 1999.
CIO Magazine 2002 Enterprise Value Awards Application, pp. 4-10, 2002.
Weinstock, Tim, ARMS/Web is Coming, pp. 1-2, Aug. 13, 1999.
GUI ARMS/400 Development Project Approach.
Enterprise Rent-A-Car Company ARMS - Vehicle Messaging System Overview, May 16, 2001, pp. 1-35.
Enterprise Rent-A-Car Company ARMS - Vehicle Messaging System Phase II Project Charter, Aug. 20, 1999, p. 1-6.
"Additional Internet Efforts Will Propel Every Segment of Our Business", Free Enterprise, Summer 1999, p. 13.

* cited by examiner

WEB ENABLED BUSINESS TO BUSINESS OPERATING SYSTEM FOR RENTAL CAR SERVICES

FIELD OF THE INVENTION

This invention relates generally to the field of an Internet enabled business-to-business intelligent communication link allowing a first business organization to have intelligent interaction with a second fully integrated business organization to facilitate the placing of orders or reservations for business services or goods, with the services or goods provider having a computer network linking multiple levels of its organization to provide for the smooth conduct of business between the two organizations. More particularly, this field relates to an Internet enabled automatic rental vehicle transaction system to facilitate the conduct of rental vehicle transactions between two multilevel business organizations, one of which provides such rental vehicle transaction services in an integrated manner through business enterprise software to a high volume user of such rental vehicle services wherein an Internet web portal is defined by the rental vehicle service provider which interconnects the two business organizations at multiple levels, providing a graphical user interface (GUI) for the transaction of large amounts of rental vehicle services automatically and virtually without human intervention upon entry.

BACKGROUND OF THE INVENTION

Computer technology has been embraced by many businesses in order to handle their ever increasing order flow as well as to mitigate the increasing blizzard of paper required to be produced to document this business. A significant benefit which often drives the implementation of technology is its further advantage in increasing productivity to thereby allow fewer people to handle greater volumes of business. One such good example demonstrating the efficiencies and value to be gained by implementing technology is the business model developed and followed by the assignee of the present invention. A rental car company at its heart, the assignee transacts an ever increasing number of time sensitive, relatively low dollar volume, vehicle rentals which in many instances require authorizations to be made in advance, reservations of vehicles from available geographic and vehicle type selections, monitoring of the rental as it progresses including possibly extending the rental under certain circumstances, communications between the various parties involved in the transaction to ensure ultimate customer satisfaction, and financial accounting for the transaction including generating invoices and processing them for payment. While a significant portion of the vehicle rental business involves rental for leisure, business travel, etc., another significant business relationship has developed with insurance companies and the like in what has been termed as the replacement car rental service business. In this business, a vehicle insurance company may have many thousands of policyholders who are eligible to be involved in accidents, and other dislocations of use, requiring that a vehicle be rented for that customer's use while his own vehicle be made ready again for use. Thus, for this business segment, a multi-tiered business organization such as a vehicle insurance company represents a significant customer for repetitive vehicle rental services. To conduct this business in an orderly, time efficient and cost efficient manner, it is necessary that this insurance company has as its business partner a vehicle rental company which is itself multi-tiered, such as the assignee of the present invention. This is because the needs, both geographically and in volume, are significant which require the dedication of a significant amount of resources. To satisfy these needs and to respond to other business growth, in its embrace of technology the assignee hereof has succeeded in developing an in-house computer system and related software which has integrated its business internally. This business integration has been massive and company-wide as is needed to integrate a company having a central office with literally thousands of individual branches located nationally, and even now internationally, with hundreds of thousands of vehicles available for rental. Furthermore, other business partners including other service providers such as vehicle repair shops have also been given access to this system to allow for input of information relating to progress of vehicle repair, extension of rental time, etc. as the rental progresses. This integrated business computer network and software generally includes a mainframe server at the heart of a wide area network (WAN) which facilitates the transfer of vehicle rental information and orders company-wide. This integrated business model is most efficient and needed in order to satisfy the vehicle rental service needs of a vehicle insurance company which itself may be national or even international in scope.

As a first step in extending the integration of technology into this business model, the present assignee has previously developed and implemented a computer system which has provided improved communication capabilities between the two business partners. This system generally comprised a second mainframe computer linked to the first mainframe of the integrated business network, with dedicated access lines being provided from this second mainframe to various levels of the multilevel business organization comprising the insurance company. In effect, with this additional mainframe and dedicated pipeline access, various individuals at the insurance company were permitted to directly interact with the integrated business computer network of the vehicle rental company as well as other selected service providers such as body shops where wrecked vehicles were being repaired. The implementation of this system provided a great step forward over the people intensive business activity previously required in order to handle the large number of transactions encountered in this business relationship. Historically, the replacement car market engendered large numbers of telephone calls being placed between the insurance company, the rental company, and the body shop where vehicle repair was being performed in order to authorize the rental, select and secure the desired replacement vehicle to be provided, monitor the progress of the repair work so that scheduling of the rental vehicle could be controlled, extending the vehicle rental in the event of delays in repair, authorizing various activities involved in the rental process including upgrades of vehicles or other charges for services, and subsequent billing of the rental service and processing the billing to the insurance company for payment.

While the implementation of this system was successful and represented a tremendous step forward in automating the business relationship between the insurance company and the vehicle rental company, it did have certain limitations. For example, a specific communication link had to be established between the rental vehicle company and the particular users at the insurance company designated to have access to this system. Thus, special attention and some modicum of expense was required to establish these "pipelines" and maintain them. Still another aspect to the system implemented was that it was not "browser" based nor did it provide graphical user interface (GUI) menus. Thus, each user had to be specifically trained in the particular "language" used by the system and learn to work with specific menus nested in a specific manner as well as codes for entering commands which were not similar to other computer software programs. This software design thus necessarily required additional training in order to insure that users could gain the full measure of advantage provided by the system and in order to minimize the opportunity for erroneous information or incorrect reservations from being entered or otherwise confusing the business transactions. Furthermore, user efficiency was not immediate and required skill beyond that ordinarily found in casual computer users, as we are all becoming in this computer age. Still another disadvantage to the system was that access was required to a designated entry point in the system in order for a person authorized to be on the system to work with it. As the nature of the insurance and replacement car business requires extreme mobility at multiple levels of both business partners, this represents a limitation to the usefulness and time efficiency with which various business functions could be performed. Therefore, while implementation of the second mainframe allowing for pipeline connections at various levels of the multi-tiered insurance company was a significant step forward in automating the business relationship between the two business partners, significant limitations to this solution were readily apparent to the users thereof.

SUMMARY OF THE INVENTION

The inventors herein have succeeded in designing and developing a means for substantially enhancing the business to business communication link between these two businesses which provide significant advantages over its prior embodiment. More particularly, the inventors have succeeded in replacing the dedicated pipeline access of the existing system with a web portal allowing Internet access to the mainframe with a browser based graphical user interface (GUI) presentation. This also made the system more readily accessible to smaller business partners as the expense of the "pipeline" was eliminated. This invention offers several important technical advantages over the previous system. First of all, by taking advantage of the ubiquitous nature of the Internet, the ultimate in portability and connectivity for this system is now provided in a business environment where mobility and connectivity are at a premium. In other words, a claims adjuster, body shop, or any other business employee authorized to have access to the system may gain access at any site offering Internet access. In present day technology that includes many mobile devices and appliances which are Internet enabled. As technology advances, it is conceivable that this access will extend to permit "24/7" access by any authorized person at any geographic location. This is a marked improvement providing immediate benefit and advantage over the dedicated pipeline access of the prior art system.

A second major advantage of the present invention is its graphical user interface. The inventors have taken full advantage of this browser based GUI to streamline and organize the presentation of information to a user to actually guide him as he interacts in doing his business. One such example is customized design of the menus such that the user is guided and directed to answer only those questions required to be answered in order to conduct the particular transaction being addressed, and further to present choices to the user for his selection to minimize the need for the user to rely on his own memory or to be familiar with complicated and specialized codes to enter data or request transaction activity. With the recent and continuing explosion of the Internet, more people are becoming familiar with browser programs and their operation through their own daily activities in their personal lives. This familiarity paves the way for easier training and quicker orientation of a new user to the present invention. For large business organizations communicating at multiple levels, this significant advantage cannot be minimized as there are large numbers of people who must be continuously trained due to the growth of the organizations, as well as the inevitable attrition. Thus, the present invention provides an immediate increase in worker productivity, and makes that improved efficiency available to many more workers who are not particularly skilled other wise in computer usage.

Still another advantage provided by the present invention is through the implementation of additional functionalities which are engendered by the browser/GUI interface. As the system is continuously used, and feedback is continuously monitored and analyzed, additional features that add value through providing management information as well as by speeding transaction activity over the system may be implemented. For example, several of these features include the ability of a user to create an on demand report for transaction activity including summaries of transactions handled by a particular user or group of users which might either be open or closed. Another example of additional functionality which improves the efficiency of a user is the ability to create a repair facility call back list which allows a user to sort existing open vehicle rental reservations by repair facility (body shop) and date such that a user is presented with the list of open reservations at a particular repair facility which can be readily handled in a single telephone call while at the same time having the system on line to implement any needed changes such as extensions of reservations, etc. Additional functionality has also been provided to speed the processing of invoicing which of course also speeds their payment and cash receipts. For example, it was found that even despite the built-in error checking and correction facilities provided to the users of the system, a repetitive pattern of mistakes involving incorrect claim numbers was discovered. To speed the processing of these, an additional functionality was provided as an "electronic audit" known as invoice return which returns an invoice to a particular adjuster upon detection of an incorrect claim number for his human intervention and correction of the claim number. In this manner, problem invoices exhibiting one of the most common problems encountered may be readily handled within the system and in an efficient manner, instead of manually as before.

The present invention also has as a significant advantage the ability to be further customized to meet the individual business partners' needs and desires as well as to provide additional functionality by offering additional features which become desirable upon accumulation of user data based on user experience. Furthermore, once implemented, they are immediately available system wide.

Still another advantage of the present invention is that the graphical user interface incorporates point and click interaction, using buttons and tabs to present or conceal data for the user's attention or inattention as the case may be, and provide a much more robust interaction capability through the creation of menu designs that allow for access to the most commonly needed features from any point in the menu architecture. This is to be contrasted with the prior system which consisted of a main frame character based interface while the present invention with its GUI interface allows a user to point and click to navigate and to make selections by pull down selection, thereby reducing errors. As users become more experienced with the system, and their confidence level grows, they are much more likely to become bored and aggravated with the rigid structure of the prior system requiring them to follow along a certain menu architecture in order to complete certain tasks. On the other hand, the present invention generally increases the interest of the user in using the system. These advantages of the present invention over the prior interface promote employee productivity by allowing a user more control over his work which is critical in achieving savings in human resources to operate the system which is one of its main goals.

While the principal advantages and features of the invention have been discussed above, a greater understanding of the invention including a fuller description of its other advantages and features may be attained by referring to the drawings and the detailed description of the preferred embodiment which follow.

DETAILED DESCRIPTION OF THE PREFERRED EMBODIMENT

Figure 1:
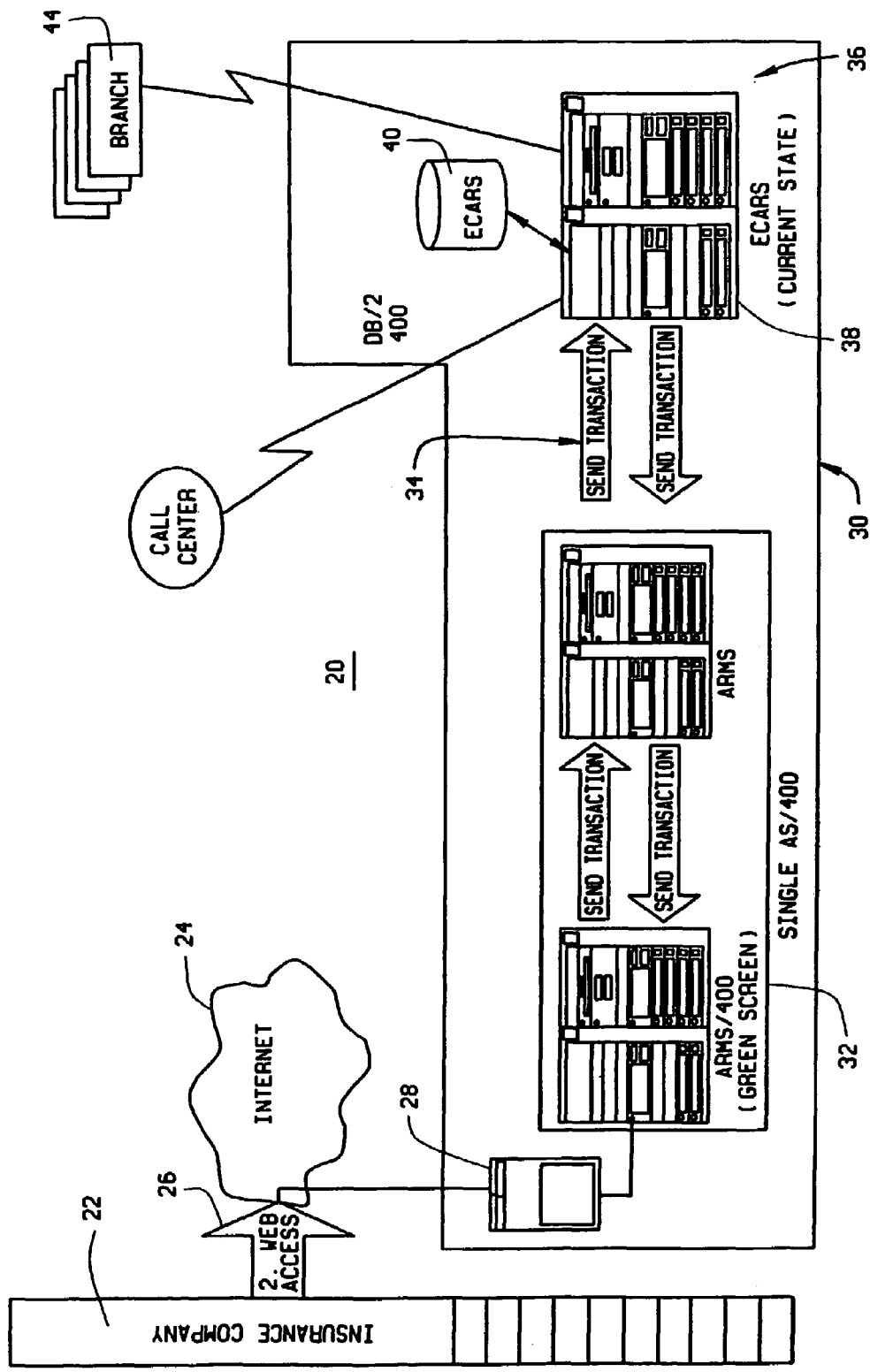
FIG. 1 is a schematic diagram of the computer systems comprising the invention.

The overall system architecture for the present invention 20 is best shown in FIG. 1. As shown therein, an insurance company computer system 22, which itself may be virtually any computer configuration or even a stand alone PC accesses the Internet 24 through any convenient access point 26 such as even including an ISP (Internet service provider), as known in the art. Also connected to the Internet 24 is a web portal 28 which is preferably provided by a server appropriately programmed as explained herein below. This web portal 28 may be appropriate configured as desired to suit any particular business relationship or arrangement, although preferably the inventors herein and assignee of this invention have determined that a 24/7 or full time connection to the Internet 24 is preferable, except for scheduled downtimes for maintenance, etc. The service provider 30 which for purposes of explaining the present preferred embodiment is preferably a vehicle rental organization, has itself an Internet portal mainframe 32 connected by a bi-directional communication link 34 to a second computer network 36 which may itself preferably have a mainframe server 38. This second computer system 36 is preferably a network having a database 40 for communication with what may be thousands of branch offices each of which has its own computer interface 44 which communicates to this second mainframe server 38 to conduct the integrated business functions of a service provider organization. Instead of communicating with the branch offices directly, a reservation may be communicated to a centralized location for further processing, such as a call center, and then relayed on to an appropriate branch office. This might be desirable under certain circumstances, such as if a branch office is closed, or when a purchaser requires some specialized service such as close monitoring of the rental. This may be done electronically and automatically, or with human intervention.

It should be noted that the particular computer configuration chosen as the preferred embodiment herein may itself be subject to wide variation. Furthermore, the term "mainframe" as used herein refers solely to a computer which can provide large scale processing of large numbers of transactions in a timely enough manner to suit the particular business application. Preferably, as is presently used by the assignee hereof, an IBM AS/400 mainframe computer is used as each of computers 32, 38. However, as is well known in the art, computer technology is subject to rapid change and it is difficult if not impossible to predict how these computer systems may evolve as technology advances in this art. For example, it is not beyond the realm of possibility that in the not so distant future a network of computers would provide the processing power to conduct these business operations as presently handled by "mainframe" computers. Thus, the term "mainframe" is not used in a limiting sense but merely to indicate that it is descriptive of a computer suited to handle the processing needs for a large scale business application.

It should also be noted that the communication link 46 extending between the server 42 and each of the branch offices 44 may have alternative configurations. For example, in some applications access over the Internet may itself be adequate, recognizing the vagaries of Internet service availability, reliability, and processing speed. Alternatively, this communication link 46 could well be a dedicated pipeline providing broadband service connection full time with back up connections to ensure continuous communication between a particular branch office or groups of branch offices and the service providers business operations computer system 36. Some branch offices might even be served through satellite links. Indeed, it is even possible that a mixture of these wide variations of service level be present within a single organization's structure depending upon communication link cost and availability balanced against service needs. It should merely be noted for present purposes that this communication link 46 serves as the electronic umbilical cord through which branch offices 44 communicate with the business computer system 36 of the present invention.

Attached hereto as exhibits are functional descriptions of the software program's resident on the computers comprising the two computer systems 32, 38 which implement the present invention. More particularly, attached hereto as Exhibit A is a functional description of the software to implement the integrated business functions resident on the AS/400 or mainframe computer 38. Attached hereto as Exhibits B and C are related flow diagrams and explanatory text, respectively, for the software resident on the mainframe AS/400 computer 32. Attached hereto as Exhibit D is a functional description of the software resident on computer 32 but which also appears on the server 28 which creates the web portal for access to the mainframe 32 and its resident program. Server 28 may use a bi-directional GUI to character based interface translator program, well known to those skilled in the art, to present the displays and information obtained and transmitted between the user and the computer 32. However, the software of Exhibit D could also be run on server 28, as would be appreciated by those of skill in the art. It is believed that these functional descriptions and accompanying text as exemplified in these exhibits are adequate to enable an ordinary programmer to implement corresponding software programs for executing the preferred embodiment of the present invention using ordinary programming skills and without inventive effort.

Figure 2:
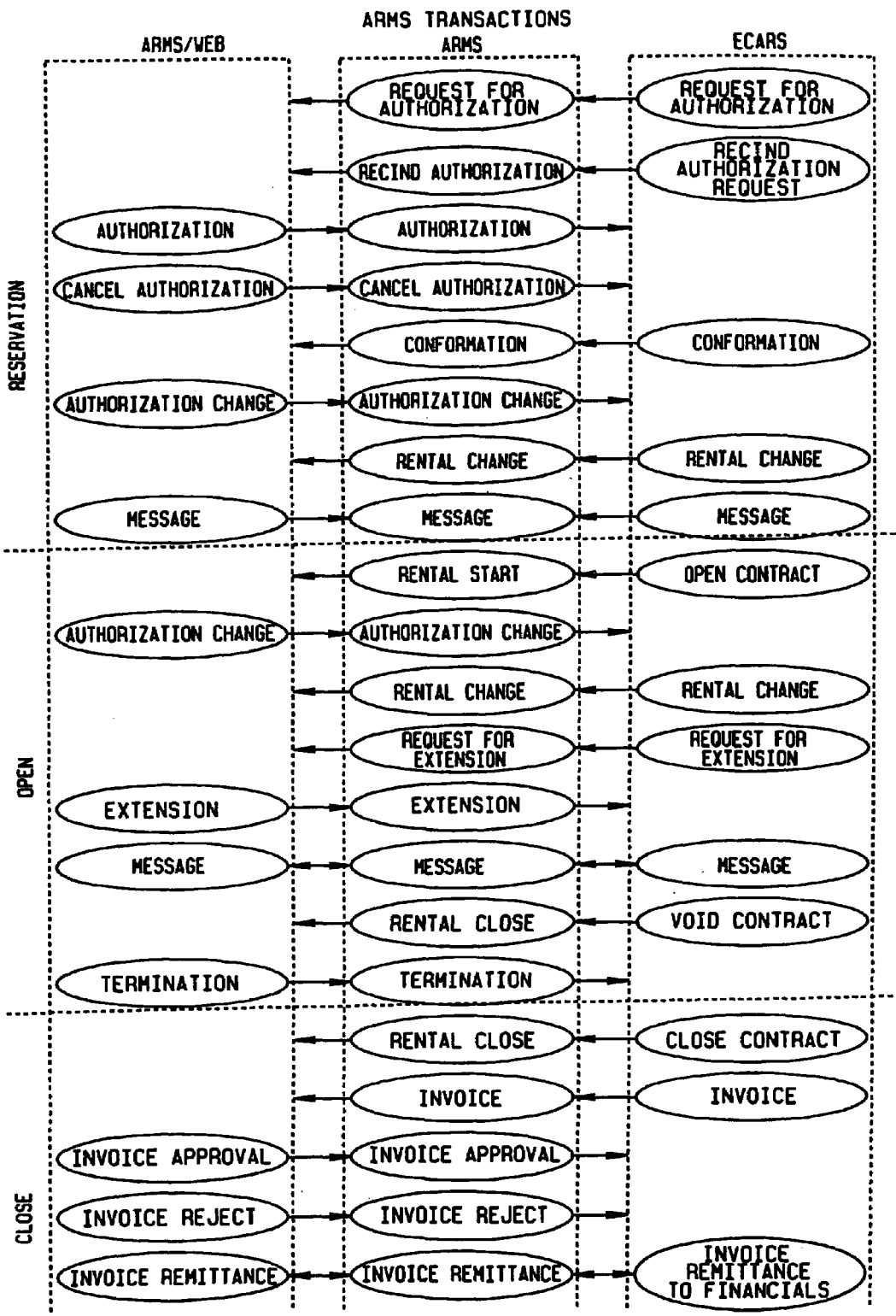
FIG. 2 is a flow chart of the software programs which communicate over the computer systems of FIG. 1 to implement the invention.

As a further example of the flow of data and the functional advantages provided by the present invention, reference is made to FIG. 2. As shown therein, a right hand column is identified as "ECARS" which represents the integrated business software implemented as part of the mainframe operation 38 in computer network 36. The center column headed "ARMS" is resident on mainframe computer 32 and coordinates the communication of data. The left column headed "ARMS/WEB" represents the software resident on computer but which is presented on server 28 and accessible by users through the Internet. Along the left side of FIG. 2 are designated three separate sections of operational activity. These are "reservation" followed by "open" are concluded by "close". Generally, the functional descriptions are arranged in chronological order proceeding from the top of FIG. 2 to the bottom. However, some functional features are permitted throughout the entirety of one of the three periods designated at the left side of FIG. 2. One such example is the "message" function which allows messages to be sent between users at one business organization 22 and branch offices 44 and others connected to the other business organization 30. Proceeding with a description of the transaction, the first set of communications allow for the reservation of the services. These can include requests for authorization or a rescind authorization request to be send from the service provider to the service purchaser. Correspondingly, authorizations and authorization cancels can be sent from the services purchaser to the services provider. Confirmations are communicated upon confirmation of an authorized reservation request. Authorization changes may be made and communicated from the services purchaser to the service provider. Corresponding rental transaction changes may be communicated from the services provider to the services purchaser. As indicated, through the entirety of this process messages may be sent between users and others connected or having access to the integrated business software, as desired. The consummation of this portion of the transaction is a reservation that has been placed, authorized, confirmed, and provision is made for changes as necessary. During the next phase of the transaction, a reservation is opened and services intended to be provided are started. Generally, and preferably for the rental of vehicles, a start and end date are established in the reservation process. However, along the way, transactional changes may be made, such as for changing the type of vehicle provided, extensions may be requested and entered from either business partner, messages may be transmitted between the business partners, and the transaction may be terminated such as by voiding the contract by one business partner or terminating the authority by the other business partner. The term "reservation" has been used herein to refer not only to the act of placing the order but also to filling the order for services including providing the rental vehicle to the ultimate user and even invoicing for those services.

The last phase of the process involves closing the transaction. During this phase of the transaction, the contract is indicated as being closed and invoiced, the services purchaser can approve invoices, reject invoices, and also remit invoices. Such invoice remittance may also include the actual transfer of funds through an electronic funds transfer medium, or otherwise as previously arranged between the business partners.

It should be understood that this is a streamlined description of the handling of a transaction, an by no means is exhaustive. For example, much more functionality is available to the user including accessing the data base to generate production reports regarding status of open or closed reservations, preparing action item lists to allow a user to organize and prioritize his work, obtaining information available in the system from having been entered by others which would otherwise require phone conversations which are inefficient and occupy still another person's time. A more detailed explanation of the functionality provided is found in the exhibits.

In summary, the present invention creates almost an illusion that the services purchaser, and the great number of users at various levels of the multi-tier purchaser users, are actually part of the services provider organization in that immediate online access is provided to significant data which enable the user to make reservations for services, monitor those services as they are being provided, communicate with those providing the services, obtain information relating to the status of services as they are being provided, and close transactions, all by interacting with the services provider business organization over that user's PC and without human interaction required by the business providers personnel. By way of contra-distinction, for many years business has been conducted on a human level by customers picking up the telephone and calling services providers and talking to their human counterparts in order to convey information, place orders, monitor orders, including obtaining information as to status, canceling orders, questioning invoices and paying invoices, along with a myriad of other related interactions. Not only did the conduct of business in this manner entail significant amounts of human resources at both ends of the transaction, but it also led to inefficiencies, mistakes and delays all of which increase the cost of doing business and contribute to an increased risk of services being rendered in an unsatisfactory manner in many instances to the end user. The present invention has taken the preexisting solution of providing electronic communication between the business partners to another level by "web enabling" this system for improved connectivity, improved usability, reduced training, enhanced mobility, and other advantages as described herein.

Various changes and modifications to the preferred embodiment as explained herein would be envisioned by those of skill in the art. Examples of these changes and modifications include the utilization of computer systems configured in any one of a myriad of ways using present technology alone. For example, mobile computers are presently available and wireless technology could be used to extend the integrated business network of the services provider, as well as match the mobility needed by the various users connected to and using the present invention. The particular software, and various aspects and features of its design, have been adapted for particular application to the vehicle rental business. Of course, computer software applications satisfying other business needs would necessarily require adaptation to their particular business models. Thus, it is envisioned by the inventors herein that the various software programs described herein would be matched to the particular business application to which the invention is utilized. These and other aspects of the preferred embodiment should not be viewed as limiting and instead be considered merely as illustrative of an example of the practical implementation of the present invention. These changes and modifications should be considered as part of the invention and the invention should be considered as limited only by the scope of the claims appended hereto and their legal equivalents.

What is claimed is:

1. An Internet enabled automatic rental vehicle transaction system, said system having an internet web portal through which a third party authorized purchaser of rental vehicle services for use by another may access, for bi-directional communication and functional interaction, a rental vehicle services provider using a digital data entry device connected to the internet, a rental vehicle software program resident on a computer system remote from said third party authorized purchaser, said rental vehicle software program being configured to automatically respond to a series of commands from said third party authorized purchaser and communicate a plurality of rental vehicle reservations through said rental vehicle software program to a second software program for fulfillment at a specific geographically remote rental vehicle location at which vehicles for rent are situated, each of said reservations including an identification of an associated repair facility where a vehicle of said another is undergoing repairs and wherein said reservations have a plurality of associated repair facilities, said rental vehicle software program collecting data relating to said plurality of reservations into a database accessible by said third party authorized purchaser and being further configured for managing of said reservations by said third party authorized purchaser including automatically generating repair facility call back lists authorizing said reservations, processing said reservations, and billing said reservations to said third party authorized purchaser so that said plurality of rental vehicle reservations may be automatically processed thereby, the repair facility call back lists being configured to allow said third party authorized purchaser to sort said reservations tat are open by at least the associated repair facilities wherein said list groups together the open reservations by one or more associated repair facilities.

2. The rental vehicle transaction system of claim 1 wherein said third party authorized purchaser comprises a business organization, said business organization having a plurality of authorized purchasers, said plurality of authorized purchasers each being enabled to access said internet web portal from any location offering internet web access, and further comprising a second business organization, said second business organization having the computer system arid rental vehicle software program resident therein.

3. The rental vehicle transaction system of claim 2 wherein said rental vehicle software program is configured to permit a rental vehicle reservation to be initiated remote from said third party authorized purchaser and communicated to said third party authorized purchaser for authorization.

4. The rental vehicle transaction system of claim 3 wherein said rental vehicle software program is configured to permit said authorized purchasers to modify said rental vehicle reservation through said internet web portal.

5. The rental vehicle transaction system of claim 4 wherein said rental vehicle software program is configured to permit said authorized purchasers to modify said rental vehicle reservation including extending a time period for which said reservation authorizes use of a rental vehicle.

6. The rental vehicle transaction system of claim 4 wherein said rental vehicle software program is configured to permit said authorized purchaser to generate reports relating to rental vehicle reservation activity conducted through said rental vehicle software program including reports summarizing rental vehicle reservation activity conducted by any one of said authorized purchasers.

7. The rental vehicle transaction system of claim 6 wherein said rental vehicle software program is configured to automatically communicate billing information to said third party authorized purchaser for further processing.

8. The rental vehicle transaction system of claim 7 wherein said rental vehicle software program is configured to communicate messages between each of said authorized purchaser and any others having access to said rental vehicle software program.

9. The rental vehicle transaction system of claim 8 wherein said rental vehicle software program is configured for allowing access through its internet web portal to a plurality of service providers, and for limiting the functionality available to any one of said plurality of service providers.

10. The rental vehicle transaction system of claim 9 wherein said plurality of service providers include vehicle repair facilities.

11. The rental vehicle transaction system of claim 1 further comprising a second computer system, said second computer system having the second computer software program resident thereon, said second computer software program being configured to process rental vehicle transactions at a plurality of geographically diverse branch facilities each of which has a plurality of vehicles for rental, said second computer system being linked to said first computer system whereat said rental vehicle software program is resident.

12. The rental vehicle transaction system of claim 11 wherein each of said first and second computer systems comprises a network having a main frame computer, said main frame computers being linked to each other, and wherein said second computer system further comprises a WAN.

13. The rental vehicle transaction system of claim 12 wherein said third party authorized purchaser comprises a business organization, said business organization having a plurality of individual authorized purchasers, said plurality of individual authorized purchasers being enabled to access said internet web portal from any location offering internet web access, and further comprising a second business organization, said second business organization having the second computer system resident therein, and wherein said second business organization includes the plurality of geographically diverse rental vehicle locations.

14. The rental vehicle transaction system of claim 13 wherein said rental vehicle software program is configured to permit a rental vehicle reservation to be initiated remote from said third party authorized purchaser and communicated to said third party authorized purchaser for authorization.

15. The rental vehicle transaction system of claim 14 wherein said rental vehicle software program is configured to permit said authorized purchasers to modify said rental vehicle reservation through said internet web portal.

16. The rental vehicle transaction system of claim 15 wherein said rental vehicle software program is configured to permit said authorized purchasers to modify said rental vehicle reservation including extending a tine period for which said reservation authorizes use of a rental vehicle.

17. The rental vehicle transaction system of claim 15 wherein said rental vehicle software program is configured to permit said authorized purchaser to generate reports relating to rental vehicle reservation activity conducted through said rental vehicle software program.

18. The rental vehicle transaction system of claim 17 wherein said rental vehicle software program is configured to automatically communicate billing information to said authorized purchaser for further processing.

19. The rental vehicle transaction system of claim 18 wherein said rental vehicle software program is configured to communicate messages between said authorized purchaser and any others having access to said rental vehicle software program.

20. The rental vehicle transaction system of claim 19 wherein said rental vehicle software program is configured for allowing access though its Internet web portal to a plurality of Service providers, and for limiting the functionality available to any one of said plurality of service providers.

21. The rental vehicle transaction system of claim 20 wherein said plurality of service providers include vehicle repair facilities.

22. An Internet-enabled automatic rental vehicle transaction system, the system comprising:

a first computer network operated by a rental vehicle service provider, the first computer network comprising a plurality of branch office computers located in a plurality of geographically remote locations at which a plurality of rental vehicles are available for rent from the rental vehicle service provider, a database in which reservation data regarding the rental vehicles available for rent at the plurality of remote locations is stored, and a first computer network mainframe in bidirectional communication with the database and the branch office computers, the first computer network mainframe being configured to execute a fulfillment software program, the fulfillment software program being configured to process and store rental vehicle reservation data in the database for access by the branch office computers when the branch office computers fulfill rental vehicle reservations; and a second computer network comprising a plurality of authorized business partner computers, a second computer network mainframe, and a web portal;

wherein the second computer network mainframe is in bidirectional communication with the first computer network, the second computer network mainframe being configured to execute a rental vehicle software program, the rental vehicle software program being configured to access the database to create and manage rental vehicle reservations in response to a series of commands received from the authorized business partner computers;

wherein the web portal is in bidirectional communication with the second computer network mainframe and further in bidirectional communication with the authorized business partner computers via an Internet connection therebetween, the web portal being configured to provide a plurality of graphical user interfaces (GUIs) for display on the authorized business partner computers, the GUIs being configured to interface a user of an authorized business partner computer with the rental vehicle software program;

wherein the authorized business partner computers are configured to access the rental vehicle software program via the Internet connection to the web portal's GUIs, thereby providing users of the authorized business partner computers with the ability to provide the series of commands to the rental vehicle software program for creating and managing rental vehicle reservations on behalf of third parties;

wherein the rental vehicle software program is further configured to access the database to generate, in response to input from a user of an authorized business partner computer, a report for display on the user's authorized business partner computer via at least one web portal GUI, the report being configured to detail a plurality of rental vehicle reservations, the user input being received by the rental vehicle software program through at least one web portal GUI, the report being sortable by a criteria specified by the authorized business partner computer user through at least one web portal GUI;

wherein a plurality of open rental vehicle reservations correspond to open rental vehicle reservations for third parties whose vehicles are undergoing repairs at a repair facility;

wherein the database is configured to store, as part of the data corresponding to a rental vehicle reservation, data identifying the repair facilities where the third parties' vehicles are undergoing repairs; and wherein the report displays data about a plurality of open rental vehicle reservations, the displayed data including the data identifying the repair facility corresponding to the open rental vehicle reservations, and wherein the user-specified sorting criteria comprises a "by repair facility" criteria.

23. The system of claim 22 wherein a plurality of open rental vehicle reservations have a stored number of authorized days therefor;

wherein the database is configured to store, as part of the data corresponding to a rental vehicle reservation, the authorized number of days for that reservation, and wherein the report displays data about a plurality of open rental vehicle reservations, the displayed data including the authorized number of days for the open rental vehicle reservations, and wherein the user-specified sorting criteria comprises a "by authorized number of days" criteria.

24. The system of claim 22 wherein a plurality of open rental vehicle reservations have a stored number of authorized days therefor, wherein the database is configured to store, as part of the data corresponding to a rental vehicle reservation, the authorized number of days for that reservation; and wherein the report displays data about a plurality of open rental vehicle reservations, the displayed data including a number of days behind for open rental vehicle reservations that have been open for more than the authorized number of days, the number of days behind being a difference between the number of authorized days for an open rental vehicle reservation and a number of days that tat rental vehicle reservation has been open, and wherein the user-specified sorting criteria comprises a "by days behind" criteria.

25. The system of claim 22 wherein the rental vehicle reservations comprise insurance replacement rental vehicle reservations.

26. An Internet-enabled automatic rental vehicle transaction system, the system comprising:

a first computer network operated by a rental vehicle service provider, the first computer network comprising a plurality of branch office computers located in a plurality of geographically remote locations at which a plurality of rental vehicles are available for rent from the rental vehicle service provider, a database in which reservation data regarding the rental vehicles available for rent at the plurality of remote locations is stored, and a first computer network mainframe in bidirectional communication with the database and the branch office computers, the first computer network mainframe being configured to execute a fulfillment software program, the fulfillment software program being configured to process and store rental vehicle reservation data in the database for access by the branch office computers when the branch office computers fulfill rental vehicle reservations; and a second computer network comprising a plurality of authorized business partner computers, a second computer network mainframe, and a web portal;

wherein the second computer network mainframe is in bidirectional communication with the first computer network, the second computer network mainframe being configured to execute a rental vehicle software program, the rental vehicle software program being configured to access the database to create and manage rental vehicle reservations in response to a series of commands received from the authorized business partner computers;

wherein the web portal is in bidirectional communication with the second computer network mainframe and is farther in bidirectional communication with the authorized business partner computers via an Internet connection therebetween, the web portal being configured to provide a plurality of graphical user interfaces (GUIs) for display on the authorized business partner computers, the GUIs being configured to interface a user of an authorized business partner computer with the rental vehicle software program, wherein the authorized business partner computers are configured to access the rental vehicle software program via the Internet connection to the web portal's GUIs, thereby providing users of the authorized business partner computers with the ability to provide the series of commands to the rental vehicle software program for creating and managing rental vehicle reservations on behalf of third parties, wherein a plurality of the rental vehicle reservations correspond to rental vehicle reservations for third parties whose vehicles are undergoing repairs at a repair facility, wherein the database is configured to store, as part of the data corresponding to a rental vehicle reservation, data identifying the repair facility where the third party's vehicle is undergoing repairs; and wherein the rental vehicle software program is further configured to access the database to generate a list for display on the user's authorized business partner computer via at least one web portal GUI, the list grouping a plurality of open rental vehicle reservations by their corresponding stored repair facility data such that open rental vehicle reservations having a common corresponding stared repair facility are commonly-grouped.

27. The system of claim 26 wherein the rental vehicle software program is further configured to generate the list in response to input from a user of an authorized business partner computer, the input being received by the rental vehicle software program through at least one web portal GUI, and the input including a request that the list group the plurality of open rental vehicle reservations by repair facility.

28. The system of claim 27 wherein the list includes a telephone number for each repair facility that is included thereon.

29. The system of claim 28 wherein the open rental vehicle reservations on the list are user-selectable to cause the web portal to display at least one GUI on the user's authorized business partner computer that is configured to receive user action on the user-selected open rental vehicle reservation, the user action to be communicated to the fulfillment software for processing thereof and storage in the database, the user action including a rental vehicle reservation extension.

30. A method for conducting a plurality of rental vehicle transactions between a rental vehicle service provider and a plurality of authorized business partners, the method comprising:

providing a plurality of branch office computers located in a plurality of geographically remote locations at which a plurality of rental vehicles are available for rent from the rental vehicle service provider;

providing a database in which reservation data regarding the rental vehicles available for rent at the plurality of remote locations is stored, storing repair facility data in the database for rental vehicle reservations to identify a plurality of repair facilities at which renters' vehicles are undergoing repairs;

providing a first mainframe in bidirectional communication with the database and the branch office computers, the first mainframe having fulfillment software resident thereon, the fulfillment software being configured to process and store rental vehicle reservation data in the database for access by the branch office computers when the branch office computers fulfill rental vehicle reservations;

providing a second mainframe, wherein the second mainframe is in bidirectional communication with the first computer network, the second mainframe having a rental vehicle software program resident thereon, the rental vehicle software program being configured to, upon execution, access the database to manage rental vehicle reservations in response to a series of commands received from a plurality of authorized business partner computers providing a web portal, wherein the web portal is in bidirectional communication with the second mainframe and is further in bidirectional communication with the authorized business partner computers via an Internet connection therebetween, the web portal being configured to provide a plurality of graphical user interfaces (GUIs) for display on the authorized business partner computers, the GUIs being configured to interface a user of an authorized business partner computer with the rental vehicle software program resident on the second mainframe such that the user can provide the series of commands for managing rental vehicle reservations;

receiving a command via at least one of the web portal GUIs from a user's authorized business partner computer;

communicating the received command to the rental software program;

executing the rental vehicle software program in response to the communicated command to thereby manage a rental vehicle reservation; and responsive to the executing step, displaying a web portal GUI on the authorized business partner computer, wherein the displayed web portal GUI includes a repair facility callback list for a plurality of open rental vehicle reservations.

31. The method of claim 30 further comprising:

displaying the web portal repair facility callback list GUI on the authorized business partner computer in response to a command received from the user of the authorized business partner computer, the command comprising a request to display a plurality of open rental vehicle reservations that are sorted by repair facility.

32. The method of claim 31 wherein the repair facility callback list is configured to display a telephone number for each repair facility.

33. The method of claim 32 further comprising:
receiving a command from the user's authorized business partner computer via the web portal repair facility callback list GUI, the command corresponding to a selection of an open rental vehicle reservation that is displayed on the repair facility callback list;
responsive to the command received via the web portal repair facility callback list GUI, displaying, on the authorized business partner computer, a web portal GUI tat is configured to receive a user command regarding an action to be taken on the selected open rental vehicle reservation, the user action comprising an extension of the selected open rental vehicle reservation.

34. The method of claim 32 further comprising:
displaying a web portal GUI on the authorized business partner computer from which the user can provide a command for the rental vehicle software program to generate a report on a plurality of rental vehicle reservations, the report comprising a plurality of fields that detail the plurality of rental vehicle reservations, the command including a command to sort the rental vehicle reservations that are displayed in the report by a user-specified criteria; and
responsive to the report generating command, displaying the report on the user's authorized business partner computer via a web portal GUI.

35. The method of claim 34 further comprising:
storing repair facility data in the database for rental vehicle reservations for which a renter's vehicle is undergoing repairs;
wherein the report includes a field for identifying the repair facility corresponding to the plurality of rental vehicle reservations listed therein, and wherein the report generating command includes a "sort by repair facility" command.

36. The method of claim 34 further comprising:
storing in the database a number of authorized days for a plurality of rental vehicle reservations, and
wherein the report includes a field for identifying the authorized number of days stored for the plurality of rental vehicle reservations listed therein, and wherein the report generating command includes a "sort by authorized number of days" command.

37. The method of claim 34 further comprising:
storing in the database a number of authorized days for a plurality of rental vehicle reservations, and
wherein the report includes a field for identifying a number of days behind for rental vehicle reservations that have been open for more than the authorized number of days, the number of days behind being a difference between the number of authorized days for a rental vehicle reservation and a number of days that that rental vehicle reservation has been open, and wherein the report generating command includes a "son by days behind" command.

38. The method of claim 30 wherein the plurality of branch office computers, the database, the first mainframe, and the second mainframe ate all maintained and operated by the rental vehicle service provider.

39. The method of claim 38 wherein the web portal is maintained and operated by the rental vehicle service provider.

40. The method of claim 30 wherein the web portal is maintained and operated by the rental vehicle service provider.

41. The method of claim 30 wherein the rental vehicle software program comprises a legacy rental vehicle software program.

42. An automatic rental vehicle transaction system, the system comprising:
a first computer network operated by a rental vehicle service provider, the first Computer network comprising a plurality of branch office computers located in a plurality of geographically remote locations at which a plurality of rental vehicles are available for rent from the rental vehicle service provider, a database in which reservation data regarding the rental vehicles available for rent at the plurality of remote locations is stored, at least a portion of the reservation data corresponding to rental vehicle reservations for third parties whose vehicles are undergoing repairs at a repair facility, the stored reservation data including data identifying the repair facilities where the third parties' vehicles are undergoing repairs, and a first computer network mainframe in bidirectional communication with the database and the branch office computers, the first computer network mainframe having fulfillment software resident thereon, the fulfillment software being configured to process and store rental vehicle reservation data in the database for access by the branch office computers when the branch office computers fulfill rental vehicle reservations; and
a second computer network comprising a plurality of authorized business partner computers and a second computer network mainframe;
wherein the second computer network mainframe is in bidirectional communication with the first computer network, the second computer network mainframe having a rental vehicle software program resident thereon, the rental vehicle software program being configured to access the database to create and manage rental vehicle reservations in response to a series of commands received from the authorized business partner computers;
wherein the authorized business partner computers are configured to access the rental vehicle software program via an electronic connection, thereby providing users of the authorized business partner computers with the ability to create and manage rental vehicle reservations on behalf of third parties, including the ability to generate a report for display on the authorized business partner computers the report comprising details about the plurality of rental vehicle reservations including sorted data therefor that identifies at least one selected from the group consisting of (1) the repair facilities where the third parties' vehicles are undergoing repairs, (2) the authorized number of days for the plurality of rental vehicle reservations, and (3) the number of days behind for rental vehicle reservations that have been open for more than the authorized number of days, the number of days behind being calculated as a difference between the number of authorized days for an open rental vehicle reservation and a number of days that that rental vehicle reservation has been open.

43. The system of claim 42 wherein the report comprises details about the plurality of rental vehicle reservations including sorted data therefor that identifies the repair facilities where the third parties' vehicles are undergoing repairs.

44. The system of claim 42 wherein the report comprises details about the plurality of rental vehicle reservations including sorted data therefor that identifies the authorized number of days for the plurality of rental vehicle reservations.

45. The system of claim 42 wherein the report comprises details about the plurality of rental vehicle reservations including sorted data therefor that identifies the number of days behind for rental vehicle reservations that have been open for more than the authorized number of days, the number of days behind being calculated as a difference between the number of authorized days for an open rental vehicle reservation and a number of days that that rental vehicle reservation has been open.

46. The system of claim 42 wherein the rental vehicle reservations included in the report are limited to open rental vehicle reservations.

* * * * *